United States Patent
Wichert et al.

(10) Patent No.: US 12,208,838 B2
(45) Date of Patent: Jan. 28, 2025

(54) ARRANGEMENT MADE OF A SUPPORTING ELEMENT AND A MOUNTING SUPPORT, AND METHOD FOR PRODUCING THE ARRANGEMENT

(71) Applicant: VOLKSWAGEN AKTIENGESELLSCHAFT, Wolfsburg (DE)

(72) Inventors: Volker Wichert, Wolfsburg (DE); Alexander Hein, Wolfsburg (DE); Tim Kühn, Wolfsburg (DE); Michael Ahlswede, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 468 days.

(21) Appl. No.: 17/415,521

(22) PCT Filed: Nov. 25, 2019

(86) PCT No.: PCT/EP2019/082445
§ 371 (c)(1),
(2) Date: Jun. 17, 2021

(87) PCT Pub. No.: WO2020/126334
PCT Pub. Date: Jun. 25, 2020

(65) Prior Publication Data
US 2022/0055694 A1 Feb. 24, 2022

(30) Foreign Application Priority Data
Dec. 20, 2018 (DE) ...................... 10 2018 222 621.0

(51) Int. Cl.
*B62D 25/08* (2006.01)
*B29C 45/26* (2006.01)
(Continued)

(52) U.S. Cl.
CPC .... *B62D 25/085* (2013.01); *B29C 2045/2683* (2013.01); *B29L 2031/3044* (2013.01); *B62D 29/041* (2013.01)

(58) Field of Classification Search
CPC ...................................................... B62D 25/085
(Continued)

(56) References Cited

U.S. PATENT DOCUMENTS 8,016,331 B2 * 9/2011 Ralston ................... B60R 19/18
293/121
8,118,346 B2 2/2012 Ginja et al.
(Continued)

FOREIGN PATENT DOCUMENTS

CN 101631694 A 1/2010
CN 102574491 A 7/2012
(Continued)

OTHER PUBLICATIONS

Machine Translation of FR2897812A1, printed from the EPO website, Sep. 28, 2023.*
(Continued)

*Primary Examiner* — Jason S Morrow
(74) *Attorney, Agent, or Firm* — PEARL COHEN ZEDEK LATZER BARATZ LLP

(57) ABSTRACT

The invention relates to an arrangement with a mounting support for a motor vehicle front end, wherein the arrangement has two supporting elements for supporting a panel/fascia element, wherein the supporting elements are each arranged on one side of the motor vehicle relative to the vehicle center in the transverse direction of the vehicle, wherein the supporting elements are fixed to the mounting support and each extend over a portion of the mounting support in the vehicle transverse direction, wherein the supporting elements project forward relative the mounting
(Continued)

Figure 1:
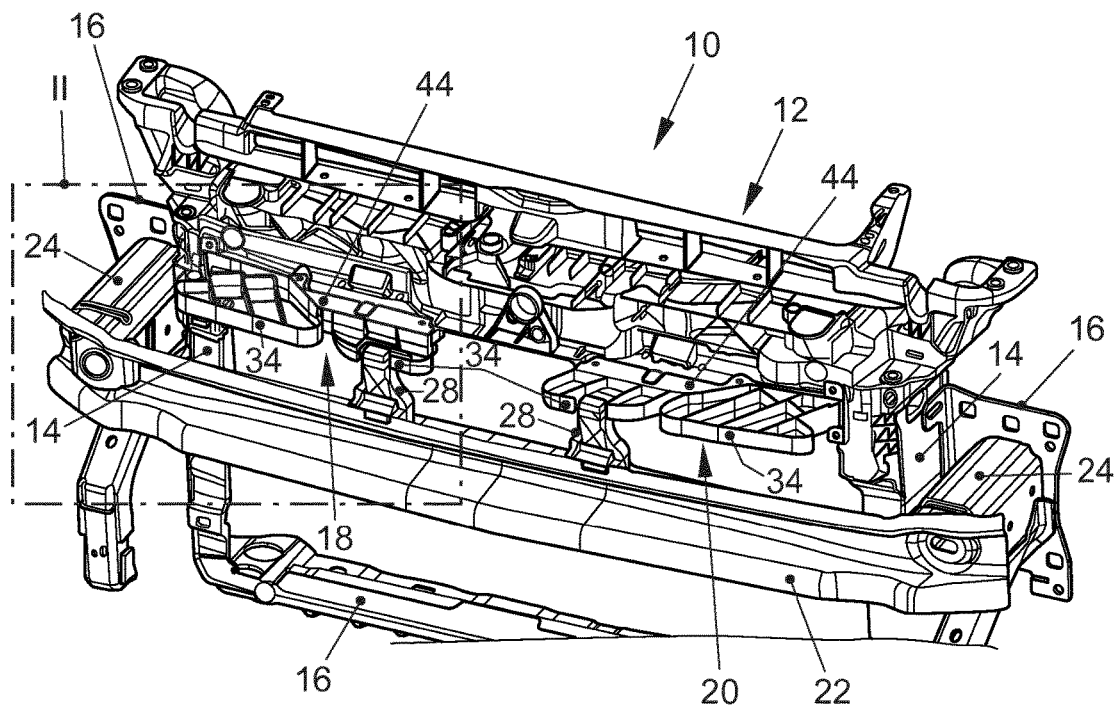

support in the vehicle longitudinal direction, wherein a panel/fascia element, which is an external skin element of the front of the motor vehicle and extends predominantly in the vehicle transverse direction, can be supported on at least one of the supporting elements.

9 Claims, 2 Drawing Sheets

(51) Int. Cl.
    *B29L 31/30*     (2006.01)
    *B62D 29/04*     (2006.01)

(58) Field of Classification Search
    USPC .................................... 296/193.09, 187.09
    See application file for complete search history.

(56) References Cited

U.S. PATENT DOCUMENTS

| | | | | |
|---|---|---|---|---|
| 8,167,361 | B2* | 5/2012 | Riviere | B62D 29/004 |
| | | | | 296/203.02 |
| 8,215,686 | B2* | 7/2012 | Czopek | B29C 51/10 |
| | | | | 293/133 |
| 8,408,346 | B2* | 4/2013 | Iania | B62D 25/085 |
| | | | | 180/311 |
| 9,365,243 | B2 | 6/2016 | Mildner et al. | |
| 9,533,714 | B2 | 1/2017 | Riedl et al. | |
| 9,630,655 | B1* | 4/2017 | Lee | B62D 29/046 |
| 9,682,728 | B2 | 6/2017 | Taneda | |
| 10,787,564 | B2* | 9/2020 | Hall | C08L 45/00 |
| 2010/0253102 | A1 | 10/2010 | Riviere et al. | |
| 2012/0247849 | A1 | 10/2012 | Ogawa | |
| 2016/0236562 | A1 | 8/2016 | Iwamoto | |
| 2018/0236966 | A1* | 8/2018 | Yoshimoto | B60R 21/34 |
| 2022/0055694 | A1* | 2/2022 | Wichert | B62D 29/041 |

FOREIGN PATENT DOCUMENTS

| | | |
|---|---|---|
| CN | 104590387 A | 5/2015 |
| CN | 104837715 A | 8/2015 |
| CN | 105599813 A | 5/2016 |
| CN | 105882762 A | 8/2016 |
| DE | 10 2004 053 257 A1 | 5/2006 |
| DE | 10 2008 048 039 A1 | 3/2010 |
| DE | 10 2011 107 995 A1 | 1/2013 |
| DE | 10 2013 007 268 A1 | 10/2014 |
| DE | 10 2014224433 A1 | 6/2016 |
| DE | 10 2016 200 452 A1 | 7/2017 |
| EP | 2028082 A1 | 2/2009 |
| EP | 2508380 A2 | 10/2012 |
| FR | 2804649 A1 | 8/2001 |
| FR | 2825964 A1 | 12/2002 |
| FR | 2897812 A1 | 8/2007 |
| FR | 2919566 A1 | 2/2009 |
| JP | 2003237631 A | 8/2003 |
| JP | 2005125962 A | 5/2005 |
| JP | 2012183851 A | 9/2012 |
| WO | WO 99/54187 A1 | 10/1999 |
| WO | WO 2002/102645 A1 | 12/2002 |

OTHER PUBLICATIONS

International Search Report of PCT Application No. PCT/EP2019/082445, mailed Feb. 27, 2020.

Office Action for Chinese Patent Application No. 201980091066.7 dated Dec. 28, 2022.

\* cited by examiner

ARRANGEMENT MADE OF A SUPPORTING ELEMENT AND A MOUNTING SUPPORT, AND METHOD FOR PRODUCING THE ARRANGEMENT

CROSS-REFERENCE TO RELATED APPLICATIONS

This application is a National Phase Application of PCT International Application No. PCT/EP2019/082445, International Filing Date Nov. 25, 2019, claiming priority of German Patent Application No. 10 2018 222 621.0, filed December 208, 2018, which is hereby incorporated by reference.

The invention relates to an arrangement made of a supporting element and a mounting support as well as to a method for producing an arrangement made of a supporting element and a mounting support.

Arrangements of the type under discussion here are usually components of so-called motor vehicle front ends. The term front end refers to a motor vehicle assembly that forms the front end of the motor vehicle. In particular, the front end includes the front fascia elements such as a bumper fascia and/or a radiator grille, but also a number of functional elements, especially components of the lighting system of the motor vehicle such as, for instance, the headlights and/or the turn signals, elements of the cooling system, especially the heat exchanger that is used in the radiator of the engine and that is usually situated in the front area of the vehicle, also sensors such as, for example, outside temperature sensors, elements of the latching system of the hood such as, for instance, a hood lock, elements of the bumper system such as, for example, crash absorption elements that, in case of a collision of the motor vehicle with an obstacle, are deformed in a specific manner, and/or structural elements that serve to attach the components of the motor vehicle front end.

An essential element of a front end is the so-called mounting support. The mounting support serves especially to hold the other components of the front end and to position them relative to each other. For this purpose, they are attached directly and/or indirectly to the mounting support. Here, the mounting support usually extends in the transverse direction (Y-direction) of the vehicle. Moreover, the mounting support can also have sections that run vertically, in other words sections that extend predominantly in the vertical direction (Z-direction) of the vehicle. A frame-like design of the mounting support is also possible, especially in order to accommodate the heat exchanger of a radiator.

Front ends of the type under discussion here are often first preassembled as a module and then joined to the car body.

The mounting support is generally a component with a complex shape, since the mounting support provides the appropriate attachment capabilities for numerous other components of the front end of the motor vehicle. For this reason, it is desirable for the front end of the motor vehicle to be designed in such a way that, in case of accident scenarios in which the front of the motor vehicle only sustains a limited deformation, the mounting support remains as intact as possible. This is why appropriate crash-absorbing elements are often installed in front of the mounting support as seen in the longitudinal direction (X-direction) of the vehicle in order to absorb the mechanical forces generated in an accident and to transfer these forces into the car body. In this process, the mounting support should only be involved in relatively serious accidents with a corresponding deformation of the entire front of the vehicle, if this can no longer be prevented by appropriate design measures.

The resultant structural designs of the front end, however, mean that fascia elements of the vehicle front end made of plastic such as, for example, a radiator grille or a bumper fascia or another exterior skin element, have to span a relatively large distance in the Y-direction. If the vehicle is exposed to unusually high heat effects, then such plastic elements can lose so much strength that they become permanently deformed, especially because of their intrinsic weight. In other words, the affected fascia elements "sag" in the area of the center of their extension in the Y-direction. As a result, gap dimensions can change and the visual appearance of the front of the vehicle can become accordingly marred.

In order to avoid this, supporting elements that extend in the X-direction away from the mounting support and towards the fascia of the front of the vehicle can be attached to the mounting support. Such a supporting element can then support a fascia element in the Z-direction, thereby preventing "sagging".

The state of the art, for example, German patent application DE 10 2008 048 039 A1, discloses an arrangement consisting of a mounting support and a guide element. The guide element serves to attach add-on parts that can also be exterior skin elements on the front of the motor vehicle. This guide element extends approximately over the entire width of the vehicle front in the Y-direction. It is attached to the mounting support by means of attachment elements.

However, due to its dimensions, especially due to the extension of the guide element in the Y-direction, this guide element has a considerable length and resultant pack size, thus making it necessary for such guide elements to be transported in special containers into which the guide elements have to be placed individually.

The invention is based on the objective of putting forward an arrangement of the above-mentioned kind as well as a method for producing an arrangement of the above-mentioned kind, thereby facilitating the parts logistics.

This objective is achieved by an arrangement as well as by a method for producing an arrangement having the features of the independent claims.

The objective is achieved by means of an arrangement having two supporting elements that serve to support a fascia element and by means of a mounting support, whereby the supporting elements are each arranged on a side of the motor vehicle and are attached to the mounting support. In each case here, the arrangement of the supporting elements refers to a side at the middle of the vehicle in the Y-direction. In other words, the supporting elements are especially arranged one behind the other in the Y-direction. In this manner, the supporting elements together can span a considerable portion of the front of the vehicle in the Y-direction, thereby effectively supporting a fascia element in the Z-direction. At the same time, however, the individual supporting elements are much shorter in length than would be the case with a single supporting element that would span a comparable portion of the front of the vehicle. It has been found that, even if, in the arrangement being proposed, the fascia elements are not supported exactly in the middle of the vehicle but rather only on both sides of the middle of the vehicle in the Y-direction, this support near the middle can nevertheless prevent the above-mentioned "sagging" of the fascia elements.

The method for producing the arrangement now provides for the supporting element to be joined to the mounting support of the arrangement. Before that, however, the supporting element is produced in a location that is at a distance from the location where the supporting element is joined to the mounting support. Thanks to its smaller extension, the supporting element can now be packed as a loose item together with other similar supporting elements. Here, especially a plurality of similar supporting elements are packed in the interior of a shared container that is not adapted to the contour of the supporting elements such as, for example, a wire mesh crate. The loose packing can especially be implemented like bulk cargo, that is to say, the parts can be "poured" into the container, for example, immediately after being produced, and are then packed especially in an irregular and/or random orientation.

In this context, it is particularly advantageous for multiple similar supporting elements to be produced simultaneously as identical parts in a mold having multiple cavities. Here, each cavity serves to produce one of the supporting elements during one production cycle.

The supporting elements can have a ribbed structure. Such a ribbed structure makes it possible for the supporting element—which has a low intrinsic weight—to be systematically stiffened in specific directions. In particular, the ribbed structure has ribs whose main extension directions extend predominantly in the vertical direction of the vehicle. Ribs oriented in this manner stiffen the supporting element in the Z-direction. The word predominantly is to be especially understood to mean that the ribs can be at an angle of up to 10°, especially up to 5°, relative to the vertical axis.

Moreover, the ribs of the ribbed structure can be oriented at an angle of at least 20°, especially at least m25° and/or at most 80°, especially at most 65°, relative to the longitudinal direction (X-direction) of the vehicle. Ribs oriented in this manner make it possible to provide a lightweight and stiff supporting element that can project, especially cantilever, at a certain distance from the mounting support in the X-direction. At the same time, however, a supporting element with such an orientation of the ribs especially exhibits good deformation behavior. In case of an accident, the ribs can buckle, thereby offering only a slight resistance to deformation of the supporting element relative to the X-direction. The forces that are transmitted to the mounting support in case of an accident are thus correspondingly slight.

The ribbed structure can have a plurality of predominantly parallel ribs (32). Thanks to these predominantly parallel ribs, adjacent pairs of ribs can be formed. The adjacent ribs of these pairs of ribs can each be joined by means of additional ribs that are arranged offset from one pair of ribs to the next pair of ribs. Owing to the offset arrangement of such a ribbed structure, an additional rib makes contact with a position on the rib where—due to the offset arrangement of the additional ribs—the flat rib surface that faces away from the additional rib is not joined to another additional rib. It has been found that, in this manner, a ribbed structure can be formed that has a high stability and stiffness in the Z-direction. At the same time, a particularly low resistance to deformation of the ribbed structure in the X-direction can be achieved. This is especially due to the fact that, at the places where the additional ribs are joined to the ribs, said additional ribs can introduce forces into said ribs, whereby these forces cannot be absorbed by any complementary counter-bearing in the form of another additional rib at the appertaining position of the specific flat rib surface that faces away from the rib in question. If the ribbed structure is deformed in the X-direction, then such introductions of force occur and the introduced forces then have to be absorbed by the ribs under unfavorable geometric conditions. The consequence is that the destruction of the ribbed structure, as a result of which the transmission of forces in the direction of the mounting support is limited to a relatively low extent.

The mounting support can be made of plastic. Plastic offers the advantage that it is inexpensive and allows complicated shaping. This is especially advantageous with regard to the mounting support since it has to provide numerous attachment possibilities for the various elements of the front end. In comparison to metal materials, however, plastics have lower strength values, which is why the supporting element described above—especially because of its deformation behavior in case of an accident—is very well suited for the combination with a mounting support that is made of plastic. The term "made of plastic" especially means that plastic as material is present in the essentially load-bearing structures of the mounting support, in other words, particularly not used merely peripherally, for example, to form individual attachment areas that are, for instance, injection-molded on. It goes without saying that, in this context, the plastic can have embedded reinforcements, especially reinforcements that are made of fiber materials and that are embedded in the plastic such as, for example, glass fibers or carbon fibers, or else metal materials. In particular, these reinforcements are reinforcements that are typically laid into injection molds and encapsulated with plastics.

The supporting element can likewise be made of plastic. In particular, it can be a plastic injection-molded part. It has been found that, especially because of the ribbed structure described above, even a plastic can ensure sufficient stiffness and strength of the supporting element. At the same time, the ribbed structure can be produced cost-effectively.

In particular, both supporting elements of the arrangement can be identical parts. The use of identical supporting elements on both sides of the vehicle translates into a larger number of identical parts and thus into a further lowering of the logistical costs.

The two supporting elements can be arranged so as to be mirror-image to each other on the mounting support. As a result, the use of identical parts is possible whereas especially the design of the appertaining supporting elements towards the middle can differ from the design of the appertaining supporting elements towards the outside. In this context, the words "inside" and "outside" refer to the position along the Y-axis. The supporting elements have a mirror-image orientation, especially with respect to a plane spanned by the Z-axis and the X-axis in the middle of the vehicle. For the symmetry of the supporting elements themselves, this means that they have a plane of mirror symmetry. This plane of symmetry of the supporting elements especially corresponds predominantly to the plane spanned by the X-axis and the Y-axis of the vehicle when the supporting elements are mounted in the vehicle. In this context, "predominantly" means that the plane of symmetry only corresponds exactly to the corresponding plane of the vehicle when the main extension directions of the supporting elements are also arranged in this plane. In actual practice, however, it is also possible for the two supporting elements to be arranged in such a way that they rise or fall slightly in one direction, for example, towards the middle of the vehicle. By the same token, they can rise or fall slightly towards the front of the vehicle. In these cases, the planes of symmetry have a corresponding deviation from exact parallelism to the X-direction and the Y-direction.

The arrangement can be configured in such a way that, in case of a frontal collision involving the vehicle, the two supporting elements can be deformed by at least 20 mm, especially by at least 80 mm, without damage occurring to the mounting support due to forces that are transmitted by the supporting elements to the mounting support. In this context, the deformation is especially a compression of the supporting elements in the longitudinal direction of the vehicle.

Such deformation behavior can especially be achieved by means of the ribbed structure of the supporting elements described above. In case of a frontal collision, it is especially the individual ribs that can "buckle", thereby allowing a deformation of the supporting element in the longitudinal direction of the vehicle with a relatively low deformation resistance. The forces transmitted to the mounting support then turn out to be correspondingly low. In particular, this means that, in case of minor accidents, the damage to the described arrangement remains limited to the relatively inexpensive and easily replaced supporting element, whereas the mounting support, whose replacement would entail considerable costs, is not damaged. The limitation of the forces introduced into the mounting support in such a scenario also opens up the possibility of manufacturing the mounting support out of a material with a lower strength such as, for instance, plastic, and of utilizing other advantages of such a material. These latter advantages can especially include the fact that complicated shapes can be created, for example, by means of injection-molding processes.

Figure 2:
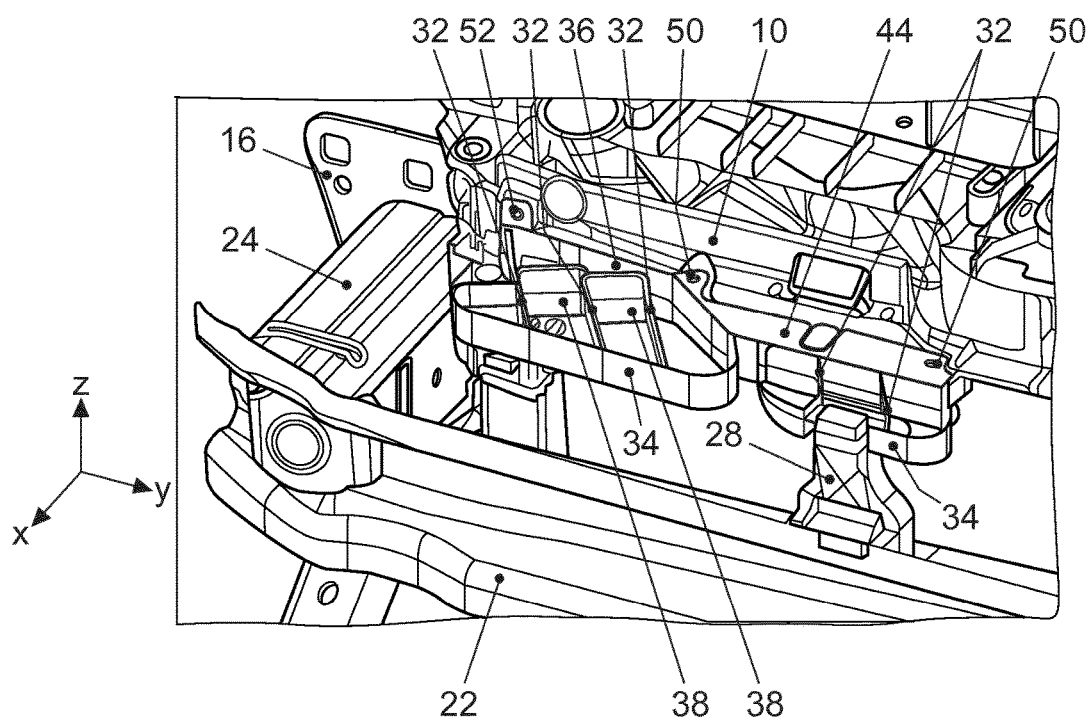
Figure 3:
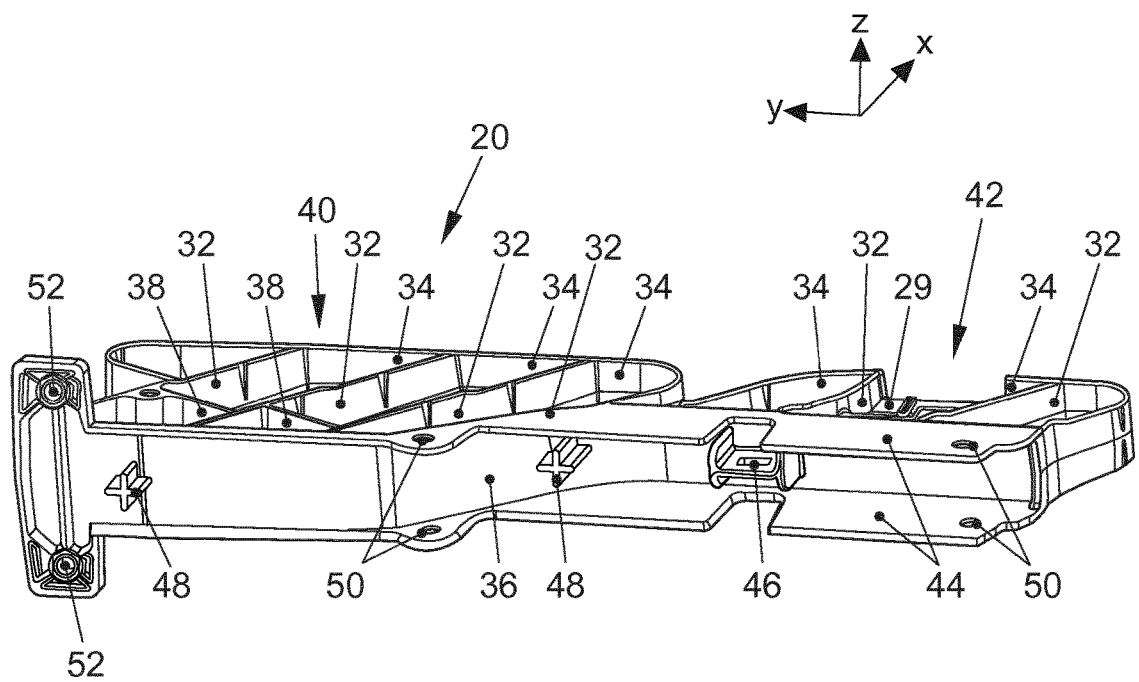

Additional practical embodiments of the invention are described below in conjunction with the drawings. The following is shown:

FIG. 1 a perspective view of an arrangement of a mounting support and two supporting elements with additional components of a vehicle front end, FIG. 2 a detailed view of a section from FIG. 1, FIG. 3 an enlarged perspective view of the back of one of the supporting elements from FIGS. 1 and 2.

The arrangement shown by way of example has a mounting support 10. As is shown in the example, the mounting support 10 can have a frame-like shape. As shown by way of example, the mounting support 10 can especially have an upper cross beam 12, a lower cross beam 16 as well as two vertical beams 14 that form the frame-like structure of the mounting support 10.

The arrangement shown has two supporting elements 18 and 20. The supporting elements 18, 20 are each arranged in the transverse direction Y of the vehicle (Y-direction) on a side of the vehicle relative to the middle of the vehicle. The supporting elements 18, 20 are attached to the mounting support 10, in the example shown, especially in the area of the upper cross beam 12 of the mounting support 10. The supporting elements 18, 20 project forward relative to the mounting support 10 in the X-direction. A fascia element—not shown in the figures—can thus rest on the supporting element 18, 20.

FIGS. 1 and 2 likewise show additional elements of the vehicle front end. These especially include the bumper cross beam 22. It extends in the Y-direction and is attached to two deformation elements 24. Such deformation elements 24 are also referred to as impact absorbers. The deformation elements 24 are attached to cross panels 26 onto which the mounting support 10 can likewise be attached, as shown in this example. The depicted and presented description of the design of the bumper cross beam 22, of the deformation element 24 and of the cross panels 26 is given merely by way of example.

As in the example shown, the supporting elements 18, 20 can have an additional support 28. As shown, the support 28 can rest on the bumper cross beam 22. This can especially be useful if, aside from the intrinsic weight of a fascia element that rests on the supporting element 18 and/or 20, additional forces, which can result, for example, from a locking mechanism of the hood, are supposed to be introduced into the supporting elements 18, 20. The supports 28 can be attached to the element upon which they rest-in the example shown, on the bumper cross beam 22—in such a way that the supports 28 allow tolerance compensation in the Z direction. For this purpose, the supports 28 can be slipped onto the bumper cross beam 22 from above in such a way that the supports 28 can move relative to the bumper cross beam 22 in the Z direction, and only when the appertaining support 28 has exceeded a certain distance in the Z direction towards the bumper cross beam 22 is a force introduced into the bumper cross beam 22. In this case, an elastic intermediate element can be arranged between the support 28 and the bumper cross beam 22 in order to prevent rattling of the support 28 which has been placed "loosely" onto the bumper cross beam 22. In this case, the support 28 only functions as a support in the Z direction for the appertaining supporting element 18 or 20 once the force acting upon the supporting element 18, 20 has deformed it in the Z direction to such an extent that the force of the support 28 starts to be introduced into the bumper cross beam 22. Up until this point, the support 28 can move on the bumper cross beam 22. Advantageously, the deformation path of the appertaining supporting element 18, 20 until the supporting action of the support 28 begins is selected in such a way that the appertaining supporting element 18, 20 merely undergoes a deformation in the elastic area. As in the example shown, the supporting elements 18 and 20 can have a support attachment area 29 for purposes of attaching a support 28. The support attachment area 29 can be configured in such a way that the support 28 can be attached to the appertaining supporting element 18 or 20 in two different, especially opposing, directions. This particularly allows the use of identical parts in the mirror-symmetrical arrangement of the supporting elements 18 and 20.

As shown, in particular, the supporting elements 18 and 20 are identical parts. The supporting elements 18, 20—as shown—can be arranged so as to be mirror-image to each other on the mounting support 10. This means that the supporting elements 18, 20 themselves have a plane of mirror symmetry. When, as in this example, the main extension directions of the supporting elements 18, 20 are oriented parallel to the Y-direction and the X-direction of the vehicle, then this plane of symmetry is likewise parallel to the X-direction and the Y-direction of the vehicle. In such a case, it is particularly advantageous if the mold-parting line of the injection mold in which the supporting element 18, 20 is produced runs in the plane of symmetry. In the example shown, an impression 30 of the mold-parting line—which lies in the plane of mirror symmetry of the supporting element 20 depicted there by way of example—can be seen on the supporting element 20 shown in FIG. 3.

The ribbed structure of the supporting elements 18, 20 especially has ribs 32 whose one main extension direction extends predominantly parallel to the Z-axis. This results in a high load-bearing capacity of the supporting elements against the load that is to be supported by the supporting element and that is supported on the appertaining supporting element 18, 20, especially in the vicinity of an edge area 34 that faces forward. In particular, ribs 32 can connect this forward-facing edge area 34 to a connection area 36 in order to join the appertaining supporting element 18 or 20 to the mounting support 10. As in the example shown here, the edge area 34 can likewise be configured in such a way that its main extension direction extends predominantly parallel to the Z-direction. As a result, the edge area 34 likewise has a high load-bearing capacity against the forces acting on the edge area 34 in the Z-direction.

The ribs 32, as shown, can extend between the edge area 34 and the connection area 36. It goes without saying that the supporting elements 18, 20 can also have additional ribs 38 that extend in other directions. The ribs 32, as shown, can be oriented predominantly in parallel and they can form pairs of ribs whose adjacent ribs 32 are each connected via additional ribs 38. The additional ribs 38 can be arranged offset from one pair of ribs to the next, as is the case in the example shown. The ribs 32 shown by way of example run at an angle of 45° relative to the longitudinal direction X of the vehicle. This orientation of the ribs 32 at a defined angle relative to the X-direction has the effect that the supporting elements shown by way of example can be easily deformed in the X-direction.

Like the supporting elements 18, 20 shown by way of example, the supporting elements of the arrangement can have discrete areas 40, 42 that project forward in the X-direction. The individual areas can then be arranged one after the other in the Y-direction, for example, as shown. The discrete areas that project forward in the X-direction make it possible to configure these areas largely independently of each other, especially as a function of their support tasks.

Moreover, the discrete areas 40, 42 that project forward also offer the possibility to configure a given area 40, 42 with respect to its deformation behavior independently of an adjacent area or adjacent areas. Thus, an individual area 40 and/or 42 that projects forward can be optimized with an eye towards a specific accident scenario, for example, a collision with a pedestrian. In the example shown, the different functional configuration is also particularly manifested in that the area 42 that projects forward can be supported on a support 28 on the bumper cross beam 22, whereas the adjacent area 40 that projects forward, which is free of additional supports, can project forward relative to the mounting support 10 in the X-direction.

In the example shown, the connection area 36 is configured in such a way that it has a plane of mirror symmetry spanned by the Y-direction and the X-direction. Two attachment areas 44 having a mirror-image configuration can project in the direction of the mounting support 10 relative to the connection area 36. A corresponding, complementarily designed area of the mounting support 10 can then be "sandwiched" between these two attachment areas 44. In order to facilitate the mounting of the supporting element 20—shown by way of example—onto the mounting support 10, the supporting element 18, 20 especially has a snap-fit connecting element 46 in the example shown. Together with a corresponding, complementary snap-fit connecting element on the mounting support 10, the snap-fit connecting element 46 can form a snap-fit connection. This permits a simple mounting procedure, in which the supporting element 20 is pressed onto the mounting support 10 until the snap-fit connection latches.

As in the example shown, centering elements 48 can be provided. By way of example, these are configured as fixation crosses. When the supporting element 20 is installed on the mounting support 10, these centering elements 48 ensure a centering of the supporting element 20 relative to the mounting support 10 in the Z-direction and in the Y-direction.

The connection area can have openings 50, 52 for attachment elements such as, for instance, screws. Such attachment elements can be used to permanently affix the supporting element 20 to the mounting support 10 during the mounting procedure. The combination shown by way of example is especially advantageous if the supporting element 20 is first "temporarily" attached to the mounting support 10 by means of a snap-fit connection using a snap-fit connecting element 46, and if it is subsequently affixed permanently by means of attachment elements such as, for example, screws.

In the example shown, the openings 50, as shown by way of example, are arranged in such a way that the attachment elements can be passed through them in the Z-direction. This is especially advantageous in conjunction with the "sandwich construction" already described above when openings 50, as shown by way of example, are provided in the attachment areas 44.

Additional openings 52 are arranged in such a way that the attachment elements can be passed through them in the X-direction. These attachment elements can especially be arranged in an area of each supporting element 18 or 20, said area projecting in the Z-direction relative to the appertaining supporting element 18 or 20. In view of the absorption of mechanical forces that act on the component connection, this permits a favorable positioning of the attachment elements held in the openings 52. In the example shown, the projecting areas in which the openings 52 are arranged have a mirror-symmetrical configuration in order to permit a corresponding mirror-symmetrical use of the exemplary supporting element 20 as an identical element, corresponding to the supporting element 18 as an identical part likewise shown in FIGS. 1 and 2. Here, it can be provided that, depending on the orientation in which the appertaining supporting element 18 or 20 is installed, only one of the existing openings 52 or a selection thereof is actually used for attaching the appertaining supporting element 18 or 20.

The features of the invention disclosed in the present description, in the drawings as well as in the claims can be essential individually as well as in any desired combination in order to realize the invention in its various embodiments. The invention can be varied within the scope of the claims and taking into account the knowledge of the pertinent person skilled in the art.

LIST OF REFERENCE NUMERALS 10 mounting support
12 upper cross beam
14 vertical beam
16 lower cross beam
18 supporting element
20 supporting element
22 bumper cross beam
24 deformation element
26 cross panel
28 support
29 support attachment area
30 mold-parting line
32 rib
34 edge area
36 connection area
38 additional rib
40 projecting area
42 projecting area
44 attachment area
46 snap-fit connecting element 48 centering element
50 opening
52 opening
X X-direction
Y Y-direction
Z Z-direction

The invention claimed is:

1. A mounting support arrangement for a motor vehicle front end, comprising:
   two supporting elements that serve to support a fascia element, wherein the fascia element is an exterior skin element on the front of the motor vehicle and extends predominantly in the transverse direction of the vehicle,
   whereby the supporting elements are each arranged on a side of the motor vehicle relative to the middle of the vehicle in the transverse direction of the vehicle,
   whereby the supporting elements are attached to a mounting support that extends in in the transverse direction of the vehicle, and each of the supporting elements has a front face that extends continuously over a portion of the mounting support in the transverse direction of the vehicle,
   whereby the supporting elements, once attached to the mounting support, project forward relative to the mounting support in the longitudinal direction of the vehicle,
   whereby at least one of the front faces of the supporting elements is configured to support the fascia element thereon, and
   wherein at least one supporting element has a ribbed structure extending from a back side of its front face, whereby the ribbed structure has ribs whose main extension directions extend predominantly in the vertical direction of the vehicle.

2. The mounting support arrangement according to claim 1, wherein the ribs extend predominantly at an angle of at least 20° relative to the longitudinal direction of the vehicle.

3. The mounting support arrangement according to claim 1, wherein the ribs are formed by a plurality of pairs of ribs that run parallel to each other and are each joined by means of additional ribs arranged offset from a first pair of ribs to an adjacent pair of ribs.

4. The mounting support arrangement according to claim 1, wherein the mounting support is made of plastic.

5. The mounting support arrangement according to claim 1, wherein the supporting elements are made of plastic.

6. The mounting support arrangement according to claim 1, wherein the two supporting elements are identical parts attached to each other so as to be mirror-image.

7. The mounting support arrangement according to claim 1, wherein the two supporting elements are configured in such a way that, in case of a frontal collision involving the vehicle, the two supporting elements can be deformed in the longitudinal direction of the vehicle by at least 20 mm, without damage occurring to the mounting support due to forces that are transmitted by the supporting elements to the mounting support.

8. A method for producing a mounting support arrangement made of a mounting support and a supporting element for a vehicle front end, comprising:
   providing a mounting support arrangement according to claim 1, and
   after the supporting element has been produced at a first location, packing the supporting element as a loose item together with other similar supporting elements, and
   transporting the supporting element to a second location, different from the first location, and attaching the supporting element to the mounting support at the second location.

9. The method according to claim 8, further comprising producing multiple supporting elements simultaneously as identical parts in an injection mold having multiple similar cavities.

* * * * *